June 10, 1969  B. BARÉNYI  3,448,996
ARRANGEMENT OF SAFETY BELTS IN VEHICLES
Filed Nov. 9, 1966

INVENTOR
BÉLA BARÉNYI

BY Dicke & Craig
ATTORNEYS

United States Patent Office 3,448,996
Patented June 10, 1969

3,448,996
ARRANGEMENT OF SAFETY BELTS
IN VEHICLES
Béla Barényi, Stuttgart-Vaihingen, Germany, assignor to
Daimler-Benz Aktiengesellschaft, Stuttgart-Unterturk-
heim, Germany
Filed Nov. 9, 1966, Ser. No. 593,187
Claims priority, application Germany, Nov. 11, 1965,
D 48,621
Int. Cl. B60r 21/10; A62b 35/00
U.S. Cl. 280—150                                    27 Claims

ABSTRACT OF THE DISCLOSURE

An arrangement for safety belts in motor vehicles, whereby one anchoring element, secured to a fixed vehicle part such as the floor or tunnel section, is provided, which extends upward approximately in the center plane of the vehicle and which may be composed of a plurality of detachable sections, one of which may be deformed by bending to dissipate sudden impact forces exerted thereon. The anchoring element is preferably of hollow construction, thus providing for the storing of the belt in a retracted condition therein, and includes retracting means which are operable to firmly grasp the belt upon a predetermined acceleration imparted to a belt. The present invention further contemplates the provision of an additional anchoring element between the end of the vehicle seat and the lateral body wall of the vehicle, which element may incorporate the features of the first element.

Figure 1A:
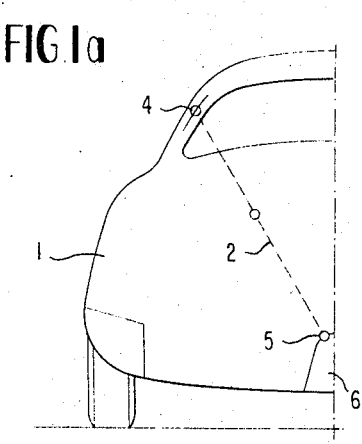

The present invention relates to an arrangement of safety belts in vehicles, especially in motor vehicles.

Safety belts are used ever more frequently for the safety of the passengers in vehicles. Essentially two arrangements of safety belts are thereby known in the prior art. With one of these known safety belt arrangements, the belts are secured with the ends thereof at the lateral body parts and at the center tunnel of the vehicle and extend obliquely over the shoulders of the passengers. The fastening or latch means of the belts thereby come to lie approximately in the center of the chests of the passengers. With the second type prior art arrangement, the ends of the belts are secured at the lateral longitudinal bearer members and at the center tunnel of the vehicle so that the belts extend approximately about the hips of the passengers. The fastening or latch means of the belts thereby again come to lie in front of the passengers.

These known arrangements of the belts in the passenger space entail disadvantages. An absolutely safe anchoring and an easy fastening of the belts is not possible with the known prior art arangements. A very considerable disadvantage of the prior art belt arrangements furthermore resides in that the passenger is only retained by the belt in case of emergency without the occurrence of a dissipation of the energy effected by the sudden impact. Likewise, the extent or arrangement of the belt over the body of the passenger does not completely fulfill its intended aim and purpose with the known arrangements. With a belt extending obliquely over the chest, the driver or passenger is limited and inhibited in his movements, and a lateral sliding out of the passenger in case of an impact or collision accident is not completely excluded. With a belt arrangement surrounding the hip, the upper body of the passenger falls forwardly without impairment and without protection in case of an impact or collision accident.

It is the aim of the present invention to create an arrangement of safety belts in vehicles, in connection with which the belt is well fastened and can be adapted particularly favorably to the body of the passenger and which in case of collision accident or the like contributes to a dissipation of considerable energy. The underlying problems are solved in accordance with the present invention in that at least one element is provided arranged approximately in the center plane of the vehicle and extending upwardly from the floor and/or center tunnel of the vehicle which element serves for the purpose of anchoring the belt ends directed toward the center of the vehicle. As a result thereof, the belt end directed toward the center of the vehicle can be secured at a higher place than possible heretofore and the belt can be arranged so as to extend less inclined over the chest of the passenger. Furthermore, by lowering the lateral securing places of the belt at the body wall, the belt can be brought even still further into the horizontal position and can be matched to each passenger height or size. For example, a separate special column may be used as upright element which possesses a circular or rectangular cross section whereby the column is preferably constructed hollow.

The anchoring of the belt ends directed toward the vehicle body walls may also take place at further upright elements arranged between the seats and the body walls of the vehicle and extending upwardly from the floor and/or longitudinal or cross bearers. With such an arangement, the belt is accordingly retained only by the elements. A securing of the belt at the lateral vehicle body walls or at the vehicle center tunnel is thereby not necessary.

In order to enable a good adaptation of the belt to the passengers, the upright elements are equipped with several anchoring connections arranged at different heights. As a result thereof, possibly several belts may be arranged simultaneously, in the case of need, for one and the same passenger at the elements or the vehicle wall and the safety is thereby further improved. The belts may be arranged thereby advantageously so as to cross each other. Also, the use of a belt provided with three ends is possible without difficulty. With such a belt, two ends may be connected at the vehicle body wall or at one element and the third end at an oppositely disposed securing place.

In further development of the present invention, the upright elements are secured at the vehicle in a readily detachable manner. Furthermore, the upright elements are constructed in an advantageous manner as deformation members so that in case of an impact or collision accident or the like during which strong tensional stresses occur at the belt or belts, they can be deformed, for example, bent or drawn apart and therewith dissipate considerable energy.

A very appropriate construction according to the present invention provides that at least the element arranged in the center plane of the vehicle is composed of several members separable from one another, of which one is constructed as easily interchangeable deformation member. It is thereby favorable if the deformation member is constituted by the base or foot portion of the upright element. A very simple and easy interchange possibility of a deformed member for a new deformation member is made possible thereby. This is of advantage in particular when the element is constructed hollow at least in the upper part thereof and serves for the accommodation of the safety belts on the inside thereof. The safety belt may be introduced thereby manually into the element. However, it is also possible that a conventional mechanism is arranged on the inside of the element for retracting the belt which, for example, may cooperate with a spring. During non-use of the belt, the latter then disappears completely into the upright element and no belt ends remain disturbingly in the passenger space which is the case with the known arrangements. It is also made possible thereby that, for example, not two belt ends are necessary but only one which extends from upright element to upright element or from the center upright element to a lateral securing place and which, when it is unhooked out of its latch or fastening means, completely disappears in the one element. The fastening or latch means of the safety belt may also be removed out of the area of the body center and may be arranged less disturbingly at one of the securing places. The retracting mechanism within the element may be provided thereby with a conventional latch or clamping means which automatically closes or operates in dependence on a predeterminable acceleration imparted to the belt and then clamps or holds fast the belt. Such a latch or clamping means permits the slow pulling out of the belt out of the upright element. If, however, a certain acceleration is imparted to the belt, then the belt immediately is clamped fast and no longer follows the tractional movement.

In order that the belt is matched favorably with its wide side to the body of the passenger, each element may be accommodated advantageously so as to extend obliquely rearwardly and may preferably possess an upper portion or section which accommodates the belt in such a manner that the belt in case of use is directed perpendicularly with respect to the element.

Accordingly, it is an object of the present invention to provide a safety belt arrangement for motor vehicles which is simple in construction, reliable in operation, and effective to remedy the aforementioned shortcomings and drawbacks encountered with the prior art constructions.

It is another object of the present invention to provide a safety belt arrangement for vehicles which excels by greater safety to the driver or passenger.

A further object of the present invention resides in a safety belt arrangement for motor vehicles of the type described above which can be readily matched to the different body sizes of the driver or the passengers, is capable of dissipating considerable energies produced by impact in case of accidents and permits a safe securing of the belts.

Still another object of the present invention resides in a safety belt arrangement for motor vehicles which retains the passenger safely against any harmful forward movements in case of accidents.

Another object of the present invention resides in a safety belt arrangement of the type described above which not only achieves all of the aforementioned objects and advantages by simple means but which also leaves to the driver and passengers a maximum freedom of movement.

A further object of the present invention resides in a safety belt arrangement for motor vehicles in which the parts, especially damaged parts, are readily interchangeable by simple means and which permits the use of structural elements contributing to the dissipation of energy in case of accident.

Figure 1B:
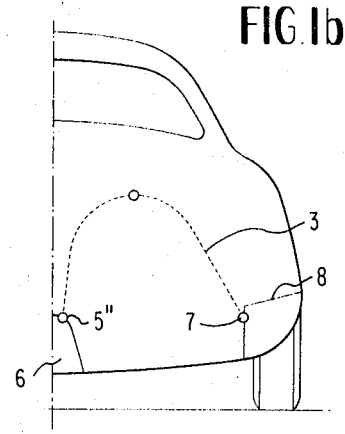
Figure 2A:
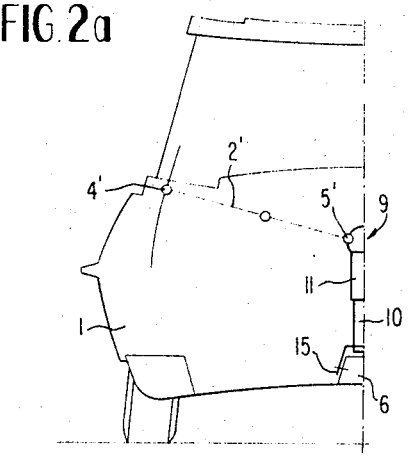
Figure 2B:
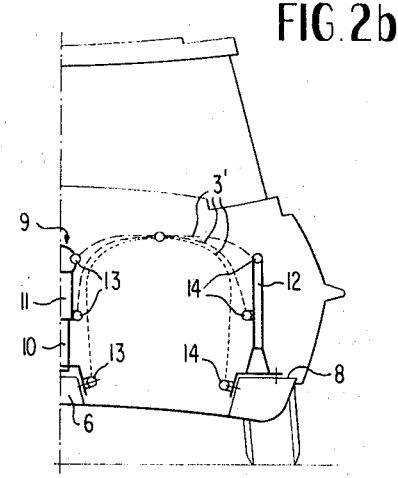

These and further objects, features, and advantages of the present invention will become more obvious from the following description when taken in connection with the accompanying drawing, which shows, for purposes of illustration only, two embodiments in accordance with the present invention, and wherein:

FIGURES 1a and 1b are two schematic partial elevational views of two prior art safety belt arrangements used most commonly in motor vehicles, and FIGURES 2a and 2b are two schematic partial elevational views illustrating two embodiments of a safety belt arrangement in motor vehicles in accordance with the present invention.

While FIGURES 1a, 1b, 2a and 2b only illustrate one-half of a vehicle, it is understood that the other half of the vehicle is of mirror-image-like construction though, of course, a motor vehicle may also be so constructed as to combine in one and the same vehicle the two safety belt arrangements, for instance, those illustrated in FIGURES 2a and 2b.

Referring now to the drawing wherein like reference numerals are used throughout the various views to designate like parts, and more particularly to FIGURES 1a and 1b, the safety belts schematically indicated therein and designated by reference numerals 2 and 3 are generally secured in a motor vehicle 1 either extending obliquely from a securing place 4 at the vehicle wall to a securing place 5 at the center tunnel of the vehicle (FIGURE 1a) or extending from a securing place 5" at the center tunnel by way of the vehicle seat to a securing place 7 at the lateral longitudinal bearer 8 of the vehicle 1. The last-mentioned arrangement is particularly widely used in the United States of America.

In the two embodiments according to FIGURES 2a and 2b, a column-like upright element generally designated by reference numeral 9 is provided in the center of the motor vehicle 1 which is detachably connected by any conventional means, for example, by means of screws or bolts with the center tunnel 6 of the vehicle 1. The element 9 essentially consists of the members or sections 10 and 11 and of the cover plate 15. The members or sections 10 and 11 as well as the cover plate 15 may consist, for example, of metal or any suitable, known synthetic plastic material. The lower member or section 10 of the element 9 is constructed as deformation member. The member or section 11 constructed in a hollow manner is placed on the lower member or section 10. The member or section 11 may serve for the accommodation of the belt or belts 2' and 3' on the inside thereof when the belts are not in use. In case of impact or collision impact accident, a force is exerted on the belt 2' or 3' which is transmitted to the upright element 9 and to the securing places 4', 5' or 13, 14 whereby the element 9 can be deformed at the lower members or section 10 thereof.

FIGURE 2b illustrates a particularly favorable construction in which, in addition to the element 9, a further column-like upright element 12 is arranged between the seat (not shown) and the lateral vehicle body wall. This element 12 is constructed in its entirety as deformation member and is readily detachably connected with the lateral longitudinal bearer 8 of the vehicle. The upright element 12 contributes during impact or collision accidents to the further dissipation of energy. Several anchoring connections 13 and 14 of any conventional construction are provided at the elements 9 to 12 at different heights thereof so that the safety belt 3 can be accommodated in different positions at the element 9 or 12 or several safety belts can be used.

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An arrangement for safety belts in vehicles, especially motor vehicles, having at least one relatively fixed part, comprising at least one anchoring element arranged approximately in the vertical longitudinal center plane of the vehicle and fixed to and extending upwardly from the relatively fixed part, the upper end thereof being free, said element being plastically deformable over at least a portion of its length and having means for the anchoring of the belt end directed toward the center of the vehicle, whereby sudden impact forces acting thereon may be effectively dissipated by plastic deformation of said anchoring element.

2. An arrangement according to claim 1, wherein said fixed part is the vehicle floor.

3. An arrangement according to claim 1, wherein the relatively fixed part is the vehicle center tunnel.

4. An arrangement according to claim 1, wherein each of said elements is provided with several anchoring connecting means arranged at different heights.

5. An arrangement according to claim 1, further comprising means for securing each of said elements at the vehicle in a readily detachable manner.

6. An arrangement according to claim 1, wherein each of said elements is constructed as deformation member.

7. An arrangement according to claim 1, wherein said element arranged approximately in the center plane of the vehicle includes a plurality of members which are readily detachable from one another, one of said members comprising an interchangeable deformation member.

8. An arrangement according to claim 1, wherein said element is constructed hollow at least in the upper portion thereof and serves for the accommodation on the inside thereof of the safety belts.

9. An arrangement according to claim 8, further comprising retracting means on the inside of the element for retracting the belts.

10. An arrangement according to claim 1, wherein said element is constructed hollow at least in the upper portion thereof and serves for the accommodation on the inside thereof of the safety belts, and further comprising retracting means on the inside of the element for retracting the belts, said retracting means including means automatically operating in dependence on a predeterminable acceleration imparted to a respective belt and operable to clamp fast the belt.

11. An arrangement according to claim 1, wherein the elements are installed inclined toward the rear.

12. An arrangement for vehicles having seat means and body wall means according to claim 1, further comprising another element extending upwardly from the relatively fixed part and arranged between the seat and the corresponding body wall means, said further element serving for the purpose of anchoring the belt end facing the body wall means.

13. An arrangement according to claim 12, wherein said last-mentioned relatively fixed part is the vehicle floor.

14. An arrangement according to claim 12, wherein said last-mentioned relatively fixed part is a longitudinal bearer member.

15. An arrangement according to claim 12, wherein said last-mentioned relatively fixed part is a cross bearer member.

16. An arrangement according to claim 12, wherein each of said elements is provided with several anchoring connecting means arranged at different heights.

17. An arrangement according to claim 12, further comprising means for securing each of said elements at the vehicle in a readily detachable manner.

18. An arrangement according to claim 12, wherein each of said elements is constructed as deformation member.

19. An arrangement according to claim 12, wherein said element is constructed hollow at least in the upper portion thereof and serves for the accommodation on the inside thereof of the safety belts.

20. An arrangement according to claim 19, further comprising retacting means on the inside of the element for retracting the belts.

21. An arrangement according to claim 12, wherein the elements are installed inclined toward the rear.

22. An arrangement according to claim 12, wherein said further element is deformable over at least a portion of its length and wherein at least said element arranged approximately in the center plane of the vehicle includes a plurality of members which are readily detachable from one another, one of said members comprising an interchangeable deformation member.

23. An arrangement according to claim 22, wherein said deformation member forms a base portion of said element.

24. An arrangement according to claim 23, wherein said element is constructed hollow at least in the upper portion thereof and serves for the accommodation on the inside thereof of the safety belts.

25. An arrangement according to claim 24, further comprising retracting means on the inside of the element for retracting the belts.

26. An arrangement according to claim 25, wherein said retracting means includes means automatically operating in dependence on a predeterminable acceleration imparted to a respective belt and operable to clamp fast the belt.

27. An arrangement according to claim 26, wherein the elements are installed inclined toward the rear.

References Cited

UNITED STATES PATENTS

| 2,863,496 | 12/1958 | Pinkel | 297—216 |
| 3,292,744 | 12/1966 | Replogle | 297—388 |
| 3,321,244 | 5/1967 | Davies et al. | 297—385 |
| 2,740,642 | 4/1956 | Atwood. | |
| 2,861,627 | 11/1958 | Smith. | |
| 2,891,804 | 6/1959 | Frayne et al. | |
| 3,289,992 | 12/1966 | Moberg. | |

FOREIGN PATENTS

| 296,509 | 2/1954 | Switzland. |
| 514,945 | 7/1955 | Canada. |

LEO FRIAGLIA, *Primary Examiner.*

ROBERT R. SONG, *Assistant Examiner.*